United States Patent [19]

Yang

[11] Patent Number: 5,569,992
[45] Date of Patent: Oct. 29, 1996

[54] DC SHUNT (OR COMPOUND) MOTOR AND ITS RELATED CIRCUIT WITH CONTROLLABLE DYNAMIC CHARACTERISTICS

[76] Inventor: Tai-Her Yang, 5-1 Taipin St., Si-Hu Town, Dzan-Hwa, Taiwan

[21] Appl. No.: 212,714

[22] Filed: Mar. 14, 1994

Related U.S. Application Data

[63] Continuation of Ser. No. 860,999, Mar. 31, 1992, abandoned.

[51] Int. Cl.$^6$ ............................................. H02D 5/00
[52] U.S. Cl. ........................ 318/526; 318/247; 318/252
[58] Field of Search .................................. 318/34, 41, 42, 318/49, 65, 66, 82–84, 112, 246–252, 255–257, 139, 140, 521–537

[56] References Cited

U.S. PATENT DOCUMENTS

| | | | |
|---|---|---|---|
| 3,820,000 | 6/1974 | Smith | 318/139 |
| 3,991,349 | 11/1976 | Watson et al. | 318/530 X |
| 4,114,076 | 9/1978 | Teranishi | 318/139 |
| 4,119,898 | 10/1978 | Morton et al. . | |
| 4,138,629 | 2/1979 | Miller et al. | 318/140 |
| 4,142,135 | 2/1979 | Fujita | 318/139 |
| 4,267,492 | 5/1981 | Manners | 318/139 |
| 4,751,439 | 6/1988 | Buchwald et al. . | |

*Primary Examiner*—David S. Martin
*Attorney, Agent, or Firm*—Bacon & Thomas

[57] ABSTRACT

A DC shunt or compound motor, in which an armature current detection device, provided to increase the current in the shunt field winding following an increase in armature load current, causes the motor to have characteristics similar to a series motor until a maximum setting value is reached, at which time the speed is held constant with increasing torque as is characteristic of a shunt-type motor. Below a minimum speed, the torque also increases as in a conventional shunt-type motor.

3 Claims, 2 Drawing Sheets

FIG. 1-A

DC SHUNT (OR COMPOUND) MOTOR AND ITS RELATED CIRCUIT WITH CONTROLLABLE DYNAMIC CHARACTERISTICS

This application is a continuation of application Ser. No. 07/860,999, filed Mar. 31, 1992 now abandoned.

SUMMARY OF THE INVENTION

The present invention relates to a DC shunt or compound motor with controllable dynamic characteristics, and particularly to a DC shunt or compound motor in which the shunt field winding current is increased following an increase in armature load current, the increase in field winding current following an increase in armature current being normally a characteristic of a series motor, until a maximum value is reached, at which time the field winding current no longer changes with the armature current, which is a characteristic of a shunt motor, the control of the shunt field winding current being by means of an active device whose impedance is varied based on feedback of the armature current The present invention may further include interlocked motors to achieve the function of synchronous or proportional operation, with the shunt field current value of a first motor (forward or backward) controlled by detecting the value of the armature load current of a second motor, and the shunt field winding current of the first motor being controlled by detecting the value of the armature current of the first motor to enable the motor set to appear synchronous.

BRIEF DESCRIPTION OF THE INVENTION

FIG. 1 is a schematic diagram showing a DC shunt or compound motor controllable dynamic characteristics according to a preferred embodiment of the invention.

FIG. 1-A is a graph showing the dynamic characteristics of the motor of FIG. 1.

DETAILED DESCRIPTION OF THE INVENTION

The conventional DC shunt type motor provides high operational efficiency. However, its starting moment is smaller than that of a series type motor, which provides a greater starting moment but has a lower operational efficiency due to field losses. The present invention provides instead a DC shunt or compound motor with controllable dynamic characteristics, and particularly a motor in which the current in the shunt field winding is caused by an active device to increase following an increase in armature load current, the increase in field current following an increase in armature load current being normally a characteristic of a series motor, but in which the increase in the field exciting current is stopped at a maximum setting value so as to produce characteristics similar to that of a shunt motor.

Figure 1:
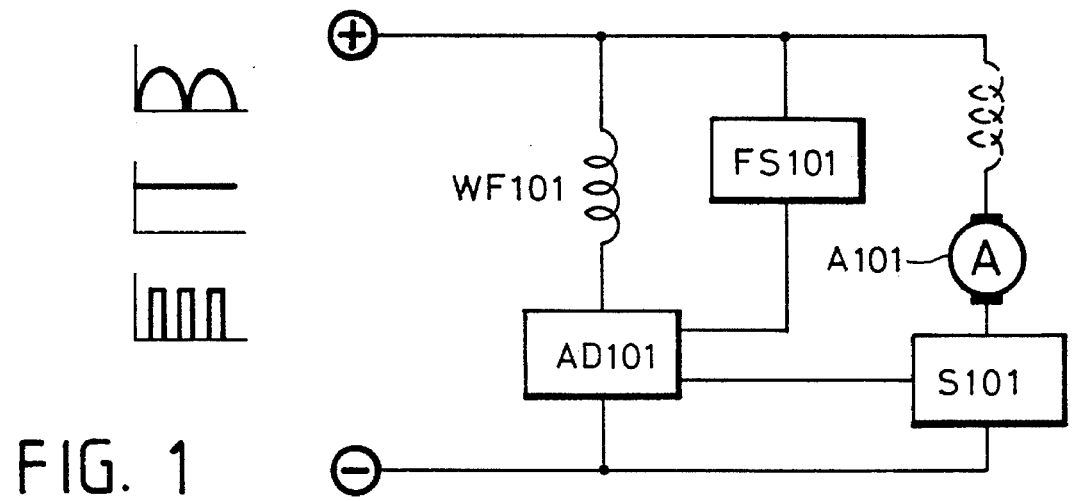

FIG. 1 is a schematic diagram of a DC compound motor which includes a conventional main shunt field winding WF101 in series with a conventional active device AD101 and in parallel to a power supply. Active device AD101 is a known solid-state switch device including, for example, a diode and a thyristor, or a bridge circuit for respectively controlling pulse widths or current to the armature.

Control switch FS101 controls active device AD101 in response to an electrical or manual control to form a speed selector switch or brake.

A DC power generator armature A101 externally connects double-throw switch and armature current detecting device S101 in series and parallel to the DC power supply.

Detecting device S101 includes a series winding, drop resistance, or impedance coil to provide a reference signal based on the armature current value for driving active device AD101. When the armature current increases following mutual cut-off, the reference signal also increases, the impedance of active device AD101 is lowered, and the driving current in the shunt field winding WF101 is thereby increased with the increase in armature current to promote output torque.

The resulting motor has characteristics of a shunt motor at maximum/minimum speed and series characteristics between maximum and minimum speed.

The operation of the motor of FIG. 1 is as follows:

When current flows into armature A101, its level is affected by the shunt field, and the resulting change is used by detecting device S101 to in turn control active device AD101 in the manner shown in FIG. 1-A. At low torques, represented by section ab in FIG. 1-A, the motor speed is limited as a result of the feedback to active device AD101 provided by armature current detecting device S101, as is characteristic of a shunt motor. At higher torques, the field current increases or decreases in proportion to the armature current, as indicated by section bc, in a manner similar to a series motor i.e., the armature current serves to provide a reference relative to which the field current increases proportionally between a minimum and maximum. At high torques, the increase in current excitation is stopped or limited when the field is saturated to form a characteristic section cd, similar to that of a shunt motor.

Figure 2:
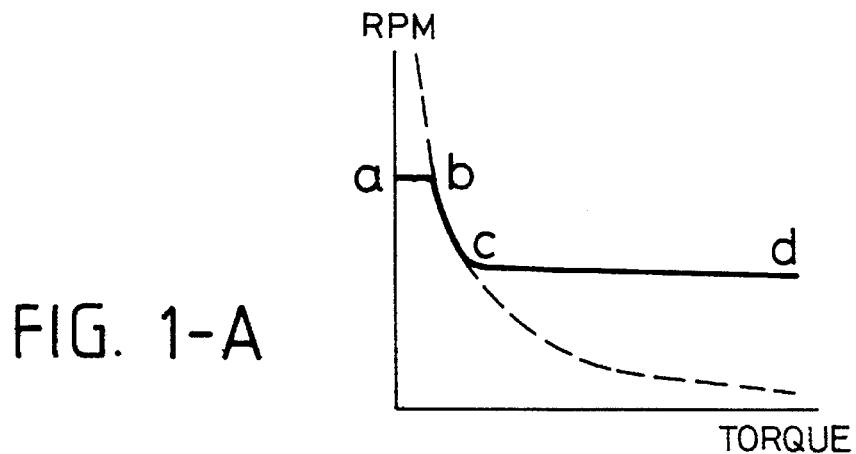
FIG. 2 is a schematic diagram of a second preferred embodiment of a DC shunt or compound motor.
Figure 2:
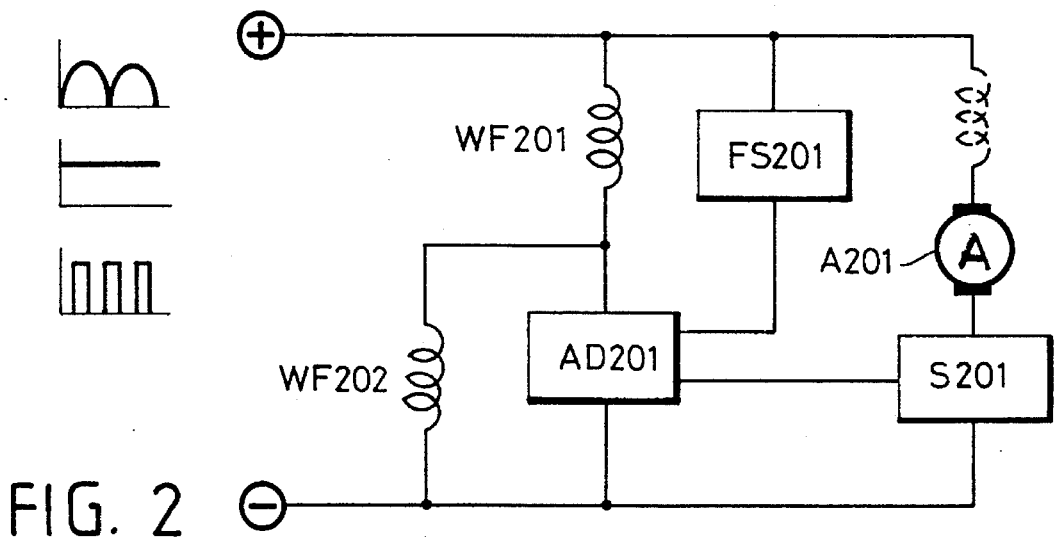
Figure 3:
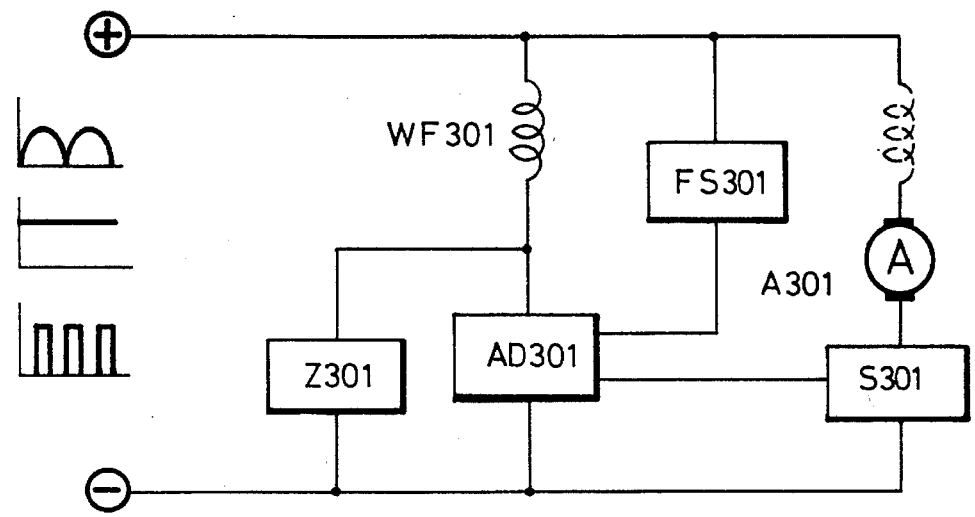
FIG. 3 is a schematic diagram of a third embodiment of a DC shunt or compound motor.

FIGS. 2 and 3 show further embodiments of circuit according to the present invention.

The embodiment of FIG. 2 includes an active device connected in parallel to same-polarity auxiliary winding WF202 of field winding WF201. In this embodiment, shunt field winding WF201 and auxiliary field winding WF202 have the same polarity and are connected in series with each other, the auxiliary field winding being connected in parallel to each side of active device AD201, while armature A201 is connected in series with detecting device S201 and in parallel with the power supply. Exciting control switch FS201 controls active device AD201 in response to an electrically-controlled interface or a manual control to form a speed control or power generating brake.

The operation of the motor of FIG. 2 is as follows:

When the armature current is small, the signal detected by detecting device S201 is also small, and active device AD201 is in a high impedance state. At this moment, the field current intensity is of reversed ratio relative to the value of impedance of auxiliary winding WF202 in series with shunt field winding WF202, and the basic exciting current maintain the armature rotation speed at a maximum for a balance between electromotive force (EMF) and power supply. When the load is increasing, the impedance of active device AD201 decreases and as a result exciting current increases. The field thus enables the motor to perform in a manner similar to a series motor. When active device AD201 has reached a saturated state of minimum impedance, the field is at a maximum exciting state and the motor has characteristics similar to those of a shunt motor.

FIG. 3 shows an embodiment in which impedance body Z301 (such as a resistance or inductance) is substituted for the auxiliary winding shown in FIG. 2.

In this embodiment, when the armature current is increasing following mutual cut-off, the reference signal is stronger, the impedance of active device AD101 is lower, and the exciting current in field winding WF101 is increased to increase the output torque.

In summary, the above motors have characteristics of a shunt motor at maximum/minimum speeds and series characteristics between maximum and minimum speed.

The present invention may further include interlocked motors to achieve the function of synchronous or proportional operation, with the field current value of a first motor (forward or backward) controlled by detecting the value of the armature load current of a second motor, and the shunt field winding current of the first motor being controlled by detecting the value of the armature current of the first motor to enable the motor set appearing synchronous.

Figure 4:
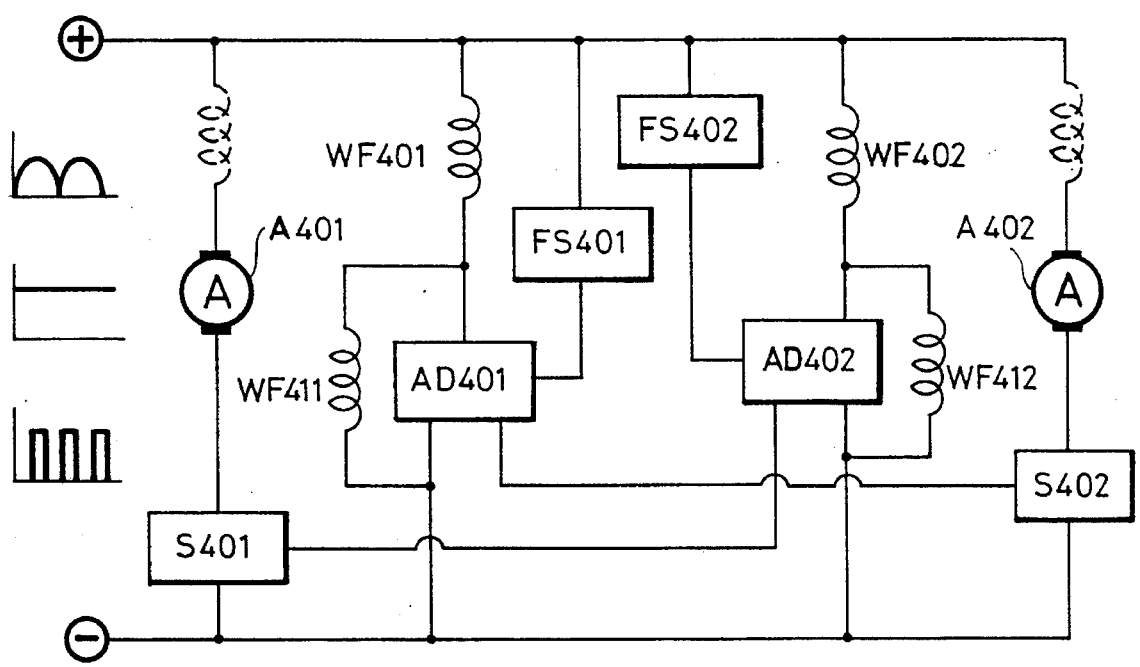
FIG. 4 is a schematic diagram showing interlocked DC motors with controllable dynamic characteristics according to a fourth preferred embodiment of the invention.

FIG. 4 is a diagram showing the interlocked DC motors of this embodiment, including two motors and their related circuitry with controllable dynamic characteristics.

The first motor has a shunt field winding WF401 of the same polarity as and in series with auxiliary winding WF211. Auxiliary winding WF211 is connected in parallel to each side of active device AD401, while parallel A401 is connected with detecting device S401 and in parallel with the power supply.

The second motor set has a shunt field winding WF402 of the same polarity as and in series with auxiliary winding WF412, which is connected in parallel to each side of active device AD402, armature A402 being connected in series with detecting device S402 and in parallel with the power supply.

The detecting signal of detecting device S401, in series with armature A 401 of the first motor, controls active device AD402 of the second motor winding while detecting signal of detecting device S401, in series with armature A402 of the second motor, controls active device AD401 of the first motor to form an interlocked motor set.

The control of the interlocked circuits is such that when one motor's armature reduces its rotational speed due to an increasing load, the signal of detecting devices series with the armature increases as the armature current increases, which reduces the impedance of the active device series with the second motor's winding, and increases the exciting current of the second motor to reduce the rotational speed of the second motor's armature to due to the increase in the field.

It will be appreciated by those skilled in the art that auxiliary windings WF411 and WF412 for the two motor fields may be installed as needed, or in be replaced by other resistances, inductances, capacitances or be combined with impedance device, with control switches FS401 and FS402 respectively controlling active devices AD401 and AD402 connected in series with the windings of each motor to enable proportional operation of the two motors due to differences in field intensity, and the dynamic energy feedback described above. The characteristics of the two motors are identical to those of the motors of FIGS. 1–4, except that characteristic section bc has a different slope.

To conclude the description mentioned above, the present invention relates to a DC shunt or compound motor and its related circuit with controllable dynamic characteristics. The preferred motor has characteristics of load torque against speed which are similar to those of a series motor, except at maximum or minimum speed, where the characteristics are those of a shunt motor, but with better efficiency than a shunt motor, to accomplish excellent speed control and dynamic energy conservation due to a smaller field exciting current. In addition to single motor operation, the invention provides for interlocking of the two motors for synchronous or proportional operation.

I claim:

1. In a DC motor, including a main shunt field winding connected in series with main shunt field winding power supply means for supplying current to said main shunt field winding, said main shunt field winding power supply means and said main shunt field winding being connected in parallel with a power supply, means for controlling the main shunt field winding power supply means to select a motor speed, and an armature connected in parallel with said series-connected main shunt field winding power supply means and main shunt field winding, the improvement comprising:

armature current detection means for providing a reference signal to said main shunt field winding power supply means based on the armature current, wherein power supplied by said main shunt field winding power supply means varies in response to the reference signal and said reference signal has a minimum and a maximum value and which is proportional to the reference signal between the minimum and maximum values, the resulting variation of the power supplied to the main shunt field winding with variations in the armature current causing energization of the main shunt field winding to have the same relationship to the armature current as if the main shunt field winding were series connected between said minimum and maximum speeds.

2. A motor as claimed in claim 1, further comprising an auxiliary field winding connected in series with said main shunt field winding and in parallel to said main shunt field winding power supply means.

3. A motor as claimed in claim 1, further comprising a device having a characteristic impedance connected in series with said main field winding and in parallel with said active device means.

* * * * *